Nov. 24, 1959  E. C. DEUBLE  2,914,123
WINDOW SCREEN FOR MOTOR VEHICLES
Filed July 5, 1957
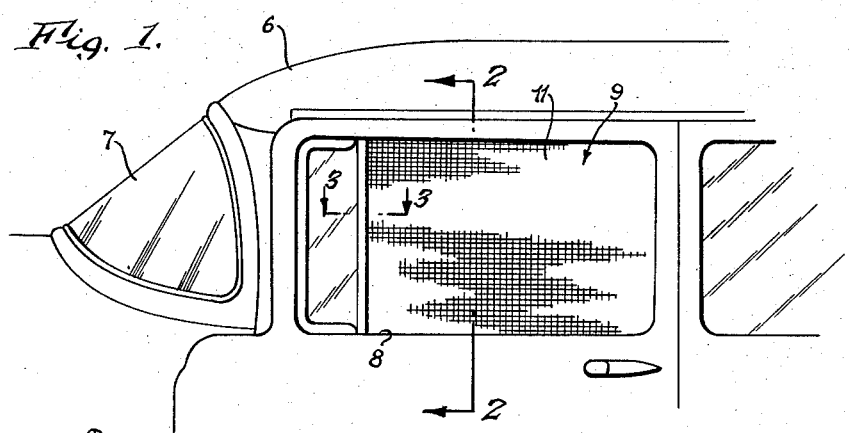
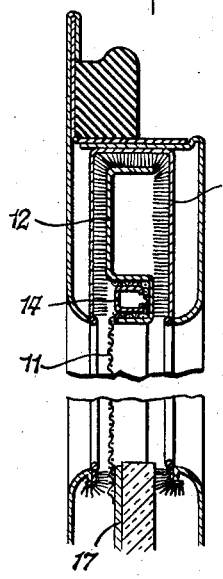
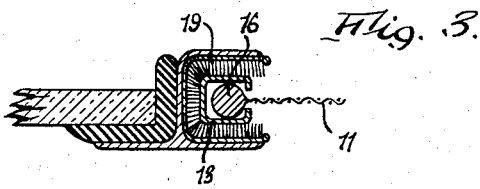
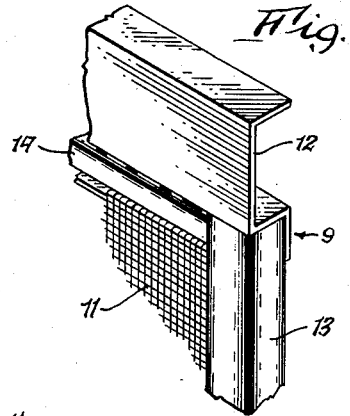
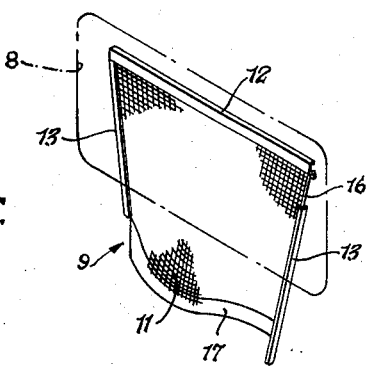
INVENTOR.
Edward C. Deuble
BY
Popp and Sommer
ATTORNEYS.

United States Patent Office 2,914,123
Patented Nov. 24, 1959

2,914,123
WINDOW SCREEN FOR MOTOR VEHICLES

Edward C. Deuble, Buffalo, N.Y., assignor of thirty percent to Richard W. Caudell, Williamsville, N.Y.

Application July 5, 1957, Serial No. 670,204

1 Claim. (Cl. 160—105)

This invention relates to window screens, and more particularly to a window screen for use on motor vehicles.

The use of motor vehicles during prolonged periods of parking, such as for attending outdoor movie theatres, has been accompanied by varying degrees of discomfort caused by insects which enter the vehicle through open windows, to partake of and otherwise annoy the vehicle occupants. Various solutions for the problem have been proposed, including the use of vehicle screens, all of which afford varying degrees of satisfaction in use.

The vehicle screen of the present invention represents an improvement in the art, and is distinguished by its extreme simplicity, convenience of application, and effectiveness in keeping insects out of a vehicle. Among other features, the vehicle screen of the present invention serves as an accessory which may be either stored in disassembled condition within the vehicle, or may be distributed by a concessionaire to vehicle occupants upon entering an outdoor theatre, and which may be readily applied without the use of special fixtures or tools.

The main object of this invention is to provide a vehicle screen which is extremely simple in form.

Another object of this invention is to provide a vehicle screen which may be conveniently mounted in a vehicle window.

Still another object is to provide a vehicle window screen which is very effective in keeping insects out of a vehicle.

A further object of the invention is to provide a vehicle screen which may be applied to a vehicle window frame without the use of special fixtures or tools.

These and further objects and features of the invention will become more apparent from the following description and the accompanying drawing wherein:

Fig. 1 is a fragmentary view of a motor vehicle illustrating a window screen of the invention as applied to the vehicle;

Figure 2 is an enlarged section view as generally seen along line 2—2 in Fig. 1;

Fig. 3 is an enlarged section view as generally seen along line 3—3 in Fig. 1;

Fig. 4 is an enlarged perspective view of a corner of the window screen of Fig. 1; and Fig. 5 is a perspective view of the window screen of Fig. 1 in the process of being applied to the vehicle.

Referring now to the drawing, the numeral 6 identifies a motor vehicle having a windshield 7 and a vented door window 8, all in the usual manner. A vehicle window screen 9, which incorporates the principles of the invention, is shown in position within the frame of the window 8, the latter of which has been lowered out of sight within the door.

The window screen 9 comprises a sheet of screening material 11, preferably made of a plastic to afford greatest flexibility, an S-shaped top bar 12, and U-shaped side bars 13, all the bars being made of a light weight rolled or extruded metal, such as aluminum. The upper edge of the screen 11 is tucked into the smaller portion of the S-shaped top bar 12, and is maintained therein by a snug fitting U-shaped bar 14, as best seen in Fig. 2. The side edges of the screen 11 are rolled to form a bead 16, which may be maintained in such condition by a cord (not shown), which beads are each slidably enclosed by a side bar 13. The lower edge of the screen 11, which extends below the lower end of the side bars 13, may have a flexible tape 17 applied along the length thereof, such tape being preferably made of a plastic material.

Bars 12 and 13 are of such width as to be snugly enclosed by the felted channels 18 and 19 respectively, which channels surround the top and side edges of the frame of the vehicle window 8. To facilitate storage and handling, the side bars 13 may be removed from the beads 16, and held by the screen 11 as the latter is rolled about the top bar 12; bars 13 may be easily slid upon the beads 16 when it is desired to use the screen.

To apply the screen 9 to the window frame of a vehicle; the vehicle window is first lowered that that it is completely enclosed within the body of the vehicle door; the top bar 12 of the screen 9 is then forced upwardly within the felted channel extending along the top of the window frame; the side bars 13 are then forced into the felted channels extending along the sides of the window frame; and finally the lower end of the screen is forced into the space, between the window and door, extending along the bottom of the window frame. The screen 9 will be held in such applied condition until its removal is desired, which requires a sequence of steps substantially in the reverse order as given for application of the screen 9 to the window frame. The screen 9 may be applied from either the inside, or the outside of the vehicle. The size of the screen 9 must obviously be substantially the same size as the window frame, if a good covering is to be obtained.

From the foregoing it will be seen that a vehicle window screen embodying the principles of the invention, will provide a convenient and effective means for preventing insects from entering a parked vehicle via the windows, and will readily satisfy all the objectives as set forth in the beginning of this disclosure.

The foregoing description has been given in detail without thought of limitation since the inventive principles involved are capable of assuming other physical embodiments without departing from the spirit of the invention and the scope of the appended claim.

What is claimed is:

A removable screen for an automobile window frame having a downwardly opening top frame channel and opposing side frame channels leading upwardly to said top channel and slidingly receiving the side edges of a glass plate which is retractable downwardly below the bottom of the window frame, said removable frame comprising a generally rectangular piece of flexible screen cloth of a width approximately equal to the window opening and a height approximately equal to the height of the window opening, a top bar approximately equal to the width of said screen cloth and fixed to the upper edge thereof and adapted to fit into said top frame channel, a pair of side bars bodily completely separable from said top bar and screen cloth and each having a longitudinal channel slidingly receiving a vertical edge of said screen cloth and slidable vertically therealong into abutting relation with the bottom of said top bar, the lower ends of said side bars being thereafter spreadable into said side channels with their lower ends adjacent said glass plate, and means holding said lower ends of said side bars in their spread condition, comprising a downward flexible extension of said screen cloth extending substantially the full width thereof and inserted into the space between said bottom of said window frame and one side of said glass panel.

References Cited in the file of this patent

UNITED STATES PATENTS

| | | |
|---|---|---|
| 1,619,501 | Evans | Mar. 1, 1927 |
| 1,964,332 | Rembaum | June 26, 1934 |
| 2,679,665 | Beard | June 1, 1954 |
| 2,804,135 | Sutton | Aug. 27, 1957 |
| 2,840,162 | Moerdyk | June 24, 1958 |